(12) United States Patent
Vandenberg

(10) Patent No.: US 6,312,205 B1
(45) Date of Patent: Nov. 6, 2001

(54) BALE LOADER

(76) Inventor: Rex Vandenberg, P.O. Box 923, Picture Butte, AB (CA), T0K 1V0

( * ) Notice: Subject to any disclaimer, the term of this patent is extended or adjusted under 35 U.S.C. 154(b) by 0 days.

(21) Appl. No.: 09/515,912

(22) Filed: Mar. 1, 2000

(30) Foreign Application Priority Data

Jul. 28, 1999 (CA) .................................................. 2278977

(51) Int. Cl.$^7$ .................................................. A01D 90/02
(52) U.S. Cl. .................. 414/24.5; 414/111; 414/489; 414/501; 414/789.7
(58) Field of Search .................. 414/24.5, 111, 414/789.7, 501, 489

(56) References Cited

U.S. PATENT DOCUMENTS

| | | | |
|---|---|---|---|
| 4,242,028 | * 12/1980 | Van Dusen | 414/320 |
| 4,498,829 | 2/1985 | Spikes . | |
| 4,909,694 | 3/1990 | Peters et al. . | |
| 4,952,111 | * 8/1990 | Callahan | 414/789.7 |
| 4,971,504 | 11/1990 | Klompien . | |
| 5,257,885 | * 11/1993 | Reil | 414/24.5 |
| 5,288,193 | * 2/1994 | Warburton et al. | 414/24.5 |
| 5,340,259 | * 8/1994 | Flaskey | 414/24.5 |
| 5,397,208 | 3/1995 | Siebenga . | |
| 5,405,229 | * 4/1995 | Tilley et al. | 414/111 |
| 5,478,194 | 12/1995 | Tilley . | |
| 5,507,612 | 4/1996 | Siebenga . | |
| 5,690,461 | 11/1997 | Tilley . | |
| 5,697,758 | 12/1997 | Tilley . | |
| 5,813,814 | * 9/1998 | Smart | 414/111 |
| 5,846,046 | * 12/1998 | Warburton | 414/111 |

* cited by examiner

Primary Examiner—Joseph A. Fischetti
(74) Attorney, Agent, or Firm—Bennett Jones LLP

(57) ABSTRACT

A bale loading arm for use with a bale carrying vehicle includes a loading frame, a device for pivoting the loading frame, a pivot member, a device for rotating the pivot member, a bale grasper having a grasper arm and a device for rotating the grasper arm. The bale grasper includes a pair of opposed paddles, one of which is movable to receive and grasp a bale. The bale grasper, pivot member and loading frame are movable to grasp a bale lying on the ground and position it above the bale carrying vehicle where it may be released.

18 Claims, 12 Drawing Sheets

BALE LOADER

FIELD OF THE INVENTION

The present invention relates to a bale loading system for loading and unloading large hay bales to and from a vehicle having a flat bed.

BACKGROUND OF THE INVENTION

When hay is cut, the cutting machine typically leaves the hay in the field in long windrows. The cut hay is baled with balers which are driven along these windrows and which pick up the hay. When sufficient hay is accumulated in the baler, it is wrapped with twine and ejected from the baler, typically onto the ground. As a result, a large number of bales are left scattered over the field. Bales come in different sizes and shapes, and include large rectangular bales measuring roughly four feet (4') by four feet (4') by eight feet (8') and weighing up to two thousand pounds.

Some mechanical devices for picking up, moving and stacking these large rectangular bales have been developed, but they either don't carry very many bales or they are not suited for road travel. Therefore, there is a need in the art for a convenient and automated system for loading a large number of the large rectangular bales onto a vehicle, transporting them relatively long distances to a storage area and unloading them.

SUMMARY OF THE INVENTION

The present invention is directed to a bale loading and carrying vehicle having a novel bale loading arm and a novel unloading/loading deck. The combination of elements of the present invention allow for automated loading and unloading of large and heavy hay bales by a single operator.

Accordingly, in one aspect of the invention, the invention comprises a bale loading arm for use with a bale carrier, said loading arm comprising:

(a) a loading frame having a proximal end and a distal end, engaging the bale carrier at its proximal end and which pivots about a substantially horizontal axis, substantially parallel to the longitudinal axis of the carrier;

(b) means for pivoting the loading frame;

(c) a pivot member rotatably engaging the distal end of the loading frame which is substantially parallel to the pivot axis of the loading frame;

(d) means for rotating the pivot member; and (e) a bale grasper having a grasper arm and grasping means affixed to the grasper arm, wherein the grasper arm is rotatably mounted to the pivot member, extending outward from the loading frame; and (f) means for rotating the grasper arm.

Preferably, the grasping means comprises a pair of opposed paddles, one of which is moveable between an open bale receiving position and a closed bale grasping position, and means for moving the moveable paddle. The pair of opposed paddles may extend from the grasping arm in the forward direction such that the bale carrier may be moved forward to position a bale within the bale grasping means. The paddle moving means may be a hydraulic cylinder disposed between the grasper arm and the paddle.

The loading frame may be moved by a hydraulic cylinder and ram attached between the bale carrier and an articulating lever arm wherein said lever arm is attached to the bale carrier and the loading frame. The pivot member rotation means comprises an orbit motor and chain drive. Alternatively, the pivot member rotation means may comprise a hydraulic cylinder and lever arm. The grasping arm rotation means may comprise an orbit motor and chain drive configuration or alternatively may comprise a hydraulic cylinder and lever arm.

In another aspect of the invention, the invention comprises a bale loading arm for use with a bale carrier having a longitudinal axis, said loading arm comprising:

(a) a first member having a proximal end and a distal end which extends laterally outward from the bale carrier and which pivots about a substantially horizontal axis, substantially parallel to the longitudinal axis of the bale carrier;

(b) means for pivoting the first member;

(c) a second member having a longitudinal axis which rotatably and pivotally engages the distal end of the first member such that the second member may rotate about its own longitudinal axis and pivot about an axis substantially parallel to the pivot axis of the first member;

(d) means for rotating the second member and means for pivoting the second member; and (e) bale grasping means affixed to the second member for grasping the bale.

In a preferred embodiment, the grasping means comprises a pair of opposed paddles, one of which is moveable between an open bale receiving position and a closed bale grasping position and means for moving one paddle. The pair of opposed paddles may extend from the grasping arm in the forward direction such that the bale carrier may be moved forward to position a bale within the bale grasping means.

Preferably, the paddle moving means comprises a hydraulic cylinder disposed between the grasper arm and the paddle. The first member pivot means may comprise a hydraulic cylinder and ram attached between the bale carrier and an articulating lever arm wherein said lever arm is attached to the bale carrier and the loading frame. The second member rotation means may comprise an orbit motor and chain drive or alternatively may comprise a hydraulic cylinder and lever arm. The second member pivot means comprises an orbit motor and chain drive configuration or alternatively may comprise a hydraulic cylinder and lever arm.

In yet another aspect of the invention, the invention comprises a bale carrying vehicle having a flat bed with a front end and a back end comprising;

(a) a bale loading arm attached to the front end of the flat bed for loading bales onto the flat bed;

(b) a pivot deck for loading and unloading bales which pivotally engages the rear end of the flat bed wherein said deck pivots between being substantially planar with the flat bed and being at a substantially right angle to the flat bed, including means for pivoting the pivot deck;

(c) bale retaining members attached to the pivot deck which extend vertically upwards when the pivot deck is planar with the flat bed and which extend horizontally when the pivot deck is at a right angle to the flat bed;

(d) a means for pushing the bales along the bale retaining members when the pivot deck is at a right angle to the flat bed; and (e) conveyor means for moving bales along the length of the flat bed and pivot deck;

In a preferred embodiment, the means for pushing the bales along the bale retaining members comprises a bale pusher, being a member pivotally attached to the pivot deck. The bale pusher may be pivoted by means of a hydraulic ram, scissor hoist or other suitable means, such that when the pivot deck is at a right angle to the flat bed, the lower end of the bale pusher, may be swung away from the pivot deck.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

Figure 1:
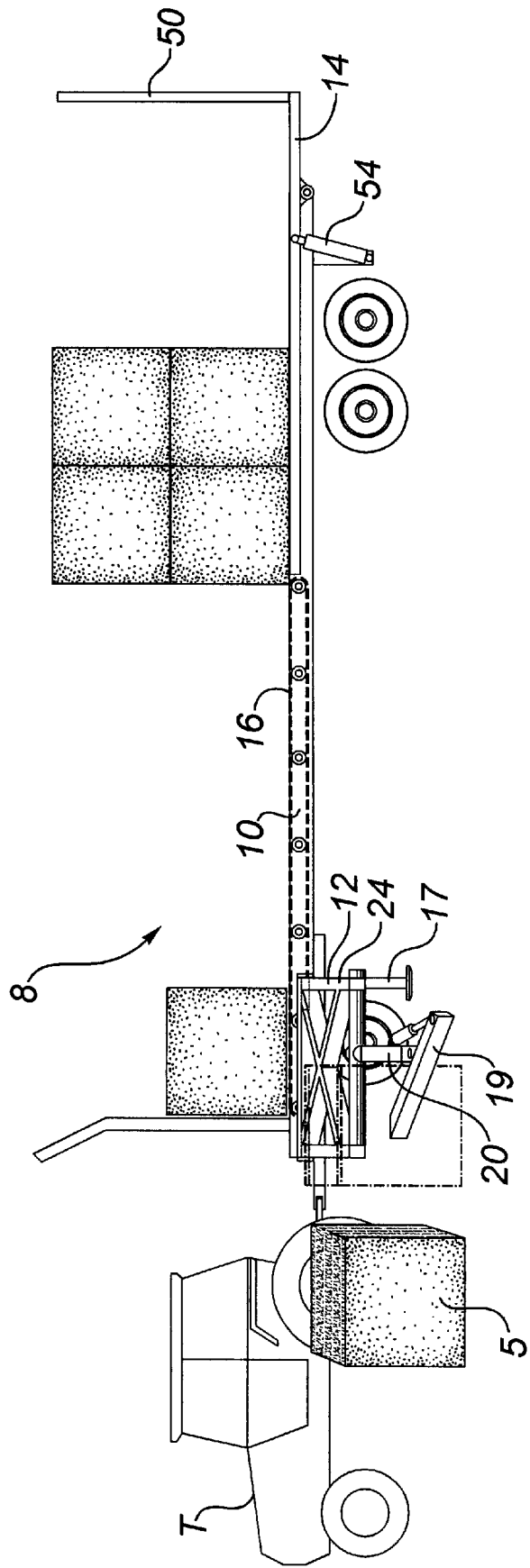
FIG. 1 is a view of a tractor/trailer having a bale loading arm of the present invention.

The present invention provides for a bale loading and unloading system. The apparatus (8) according to the Figures comprises a flat bed trailer (10) which is towed by a motorized vehicle such as a tractor (T) or transport truck (not depicted). A bale loading arm (12) is provided at the front end of the trailer (10) and a pivot deck (14) is provided at the rear of the trailer. Bales which are loaded onto the trailer (10) may be moved the length of the trailer deck (44) by the chain conveyor (16) and pivot deck chain conveyor (56) provided in the preferred embodiment.

Figure 2:
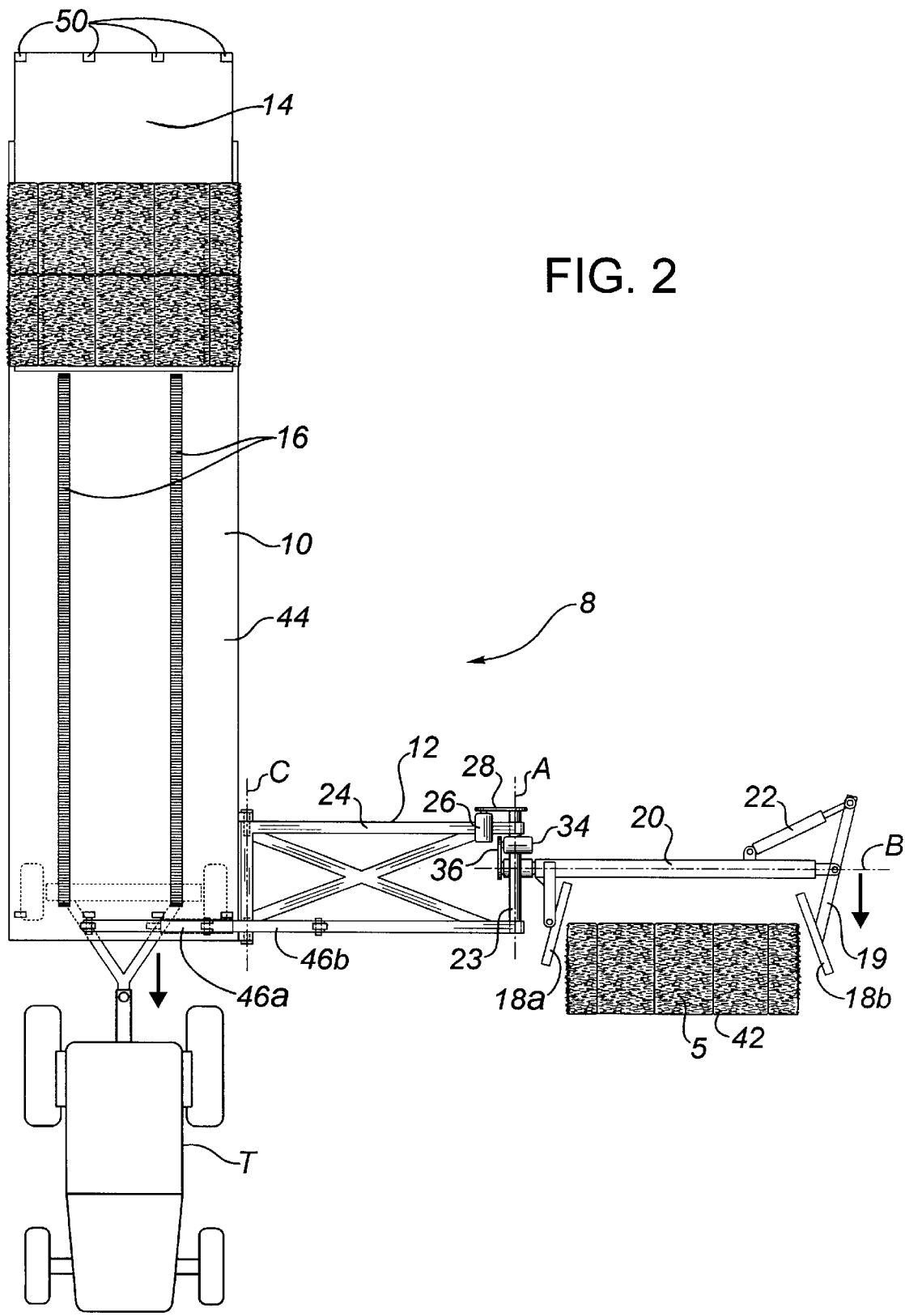
FIG. 2 is a top plan view of the present invention showing the bale grasping paddles in position to receive a bale.
Figure 2A:
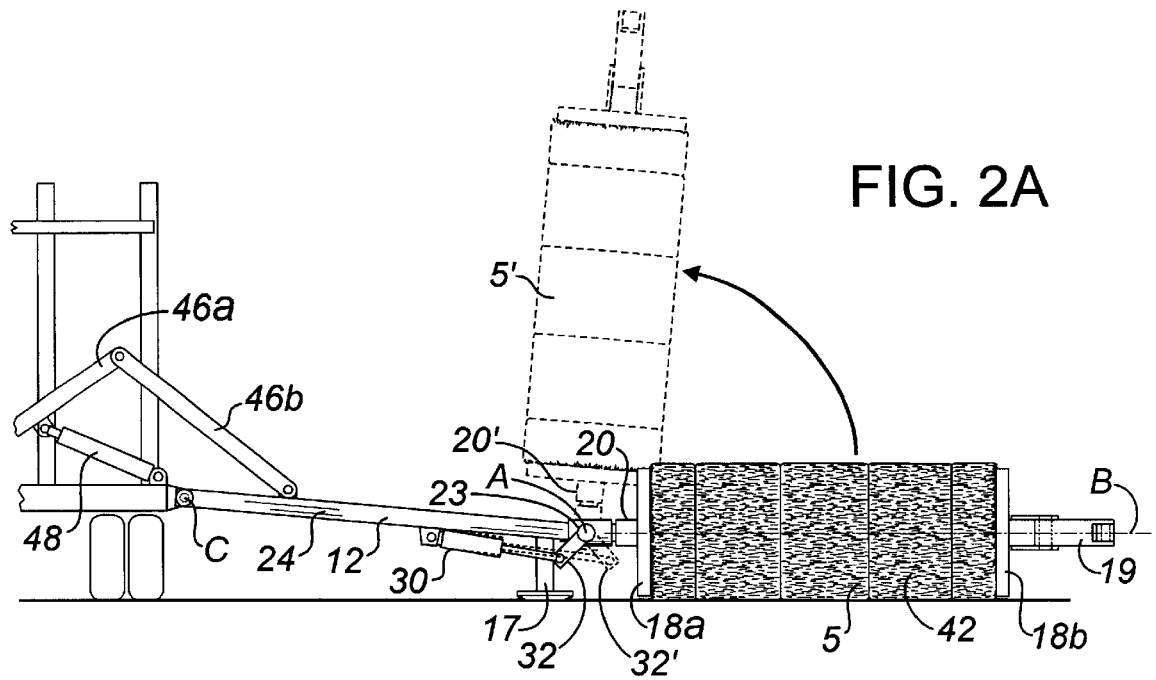
FIG. 2A is a front view of the present invention showing an alternative embodiment of the pivot member rotation means.
Figure 2B:
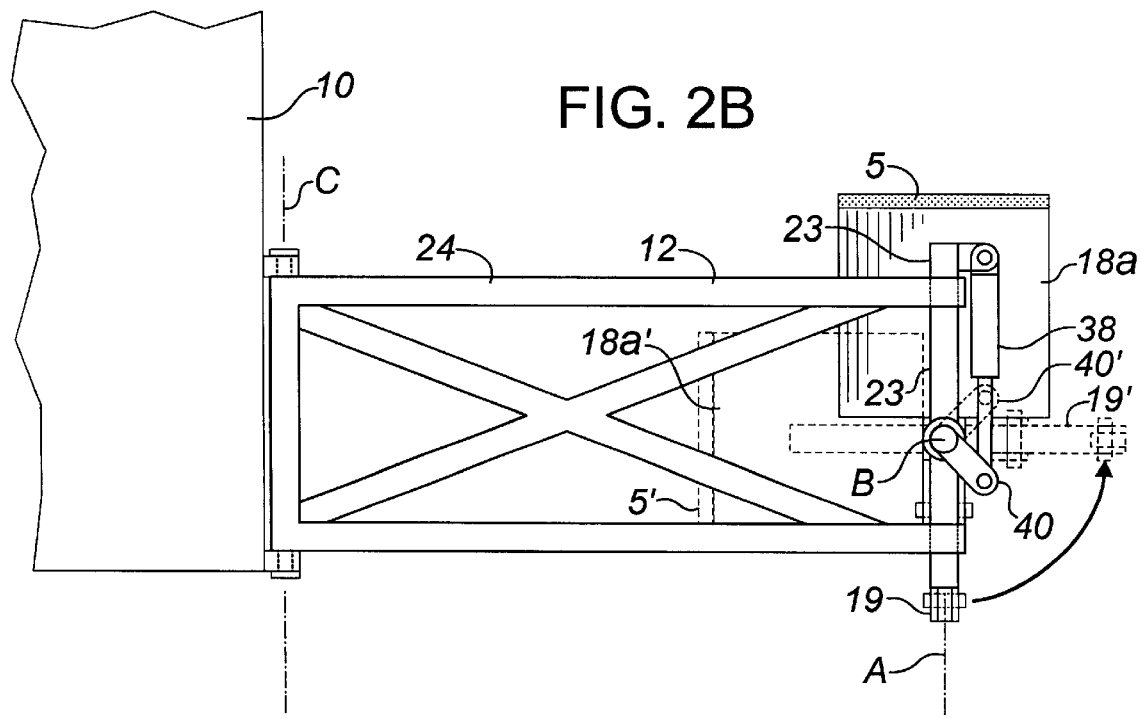
FIG. 2B shows an alternative embodiment of the grasper arm rotation means.
Figure 3:
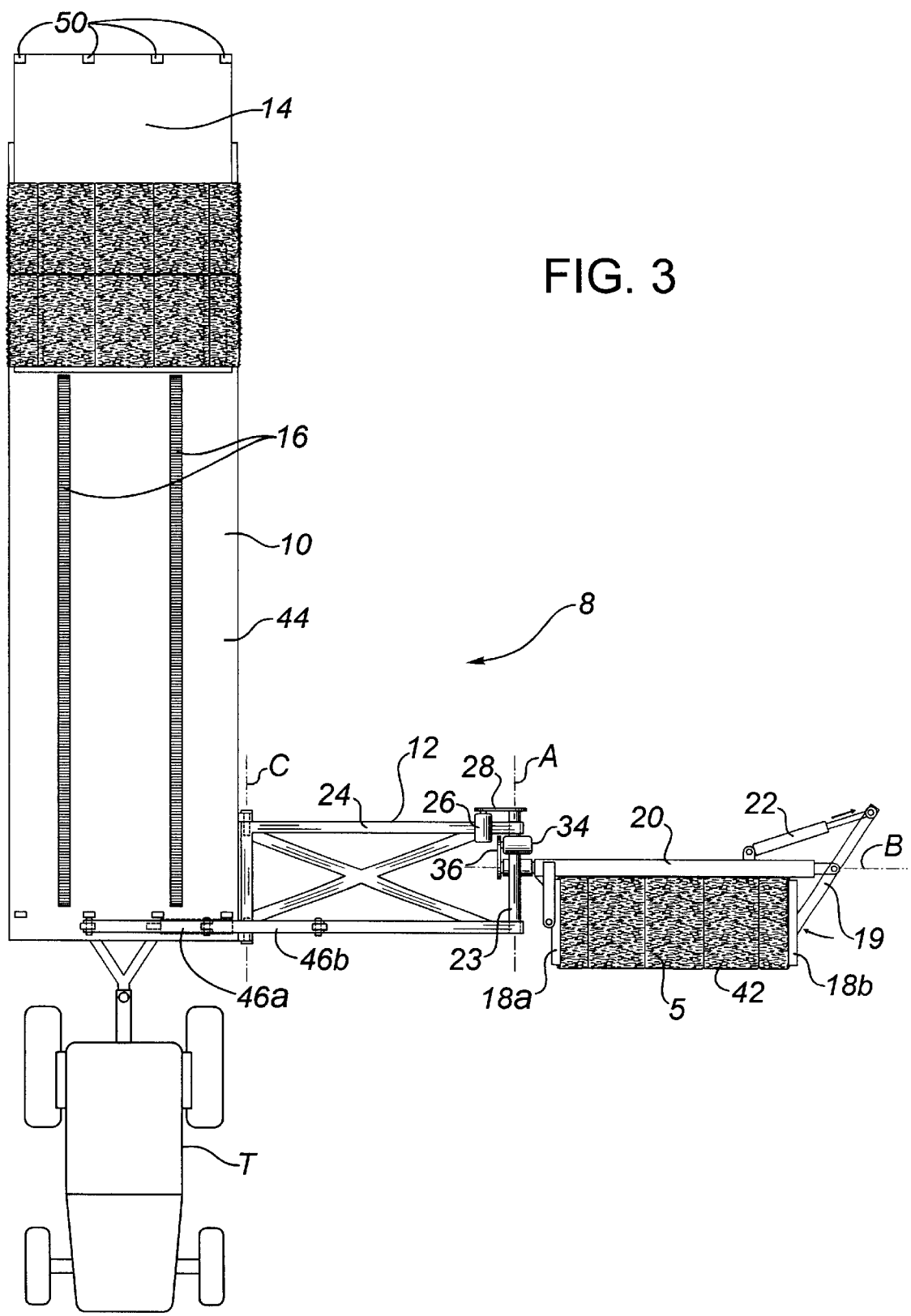
FIGS. 3, 4, 5 and 6 are sequential views of a top plan view, similar to FIG. 2, showing the grasping, pivoting and rotating steps of the bale loading arm.

The operation of the bale loading arm (12) will now be described. The tractor/trailer is driven alongside a bale (5) with the bale grasping paddles (18a, 18b) in the open position, as is shown in FIG. 2 and with the bottom of the support leg (17) in contact with the ground. The bottom of the support leg (17) can be any device or shape which facilitates sliding on the ground, such as a skid plate (depicted) or a wheel (not shown). In the preferred embodiment depicted, the inner paddle (18a) is pivotally attached to the grasper arm (20) and is biased in a slightly open position to facilitate receiving a bale between the two paddles. In the preferred embodiment depicted, the outer paddle (18b) is pivotally attached to the outer paddle lever arm (19) and is biased in a slightly open position to facilitate receiving a bale between the paddles. The inner paddle (18a) may be biased in the open position by means of a spring (not shown) attached to the inner paddle (18a) and to the grasper arm (20). The outer paddle (18b) may be biased in the open position by means of a spring (not shown) attached to the outer paddle (18b) and the outer paddle lever arm (19). The outer paddle lever arm (19) is pivotally attached to the grasper arm (20). When a bale (5) is in position between the paddles (18a, 18b) and abutting the grasper arm (20), the outer paddle (18b) may then be moved to its closed position, squeezing the bale (5) between the two paddles, as is shown in FIG. 3. The movement of the outer paddle may be accomplished by any mechanical means. In a preferred embodiment, a hydraulic cylinder (22) is provided to open and close the grasping paddles (18a, 18b).

Figure 4:
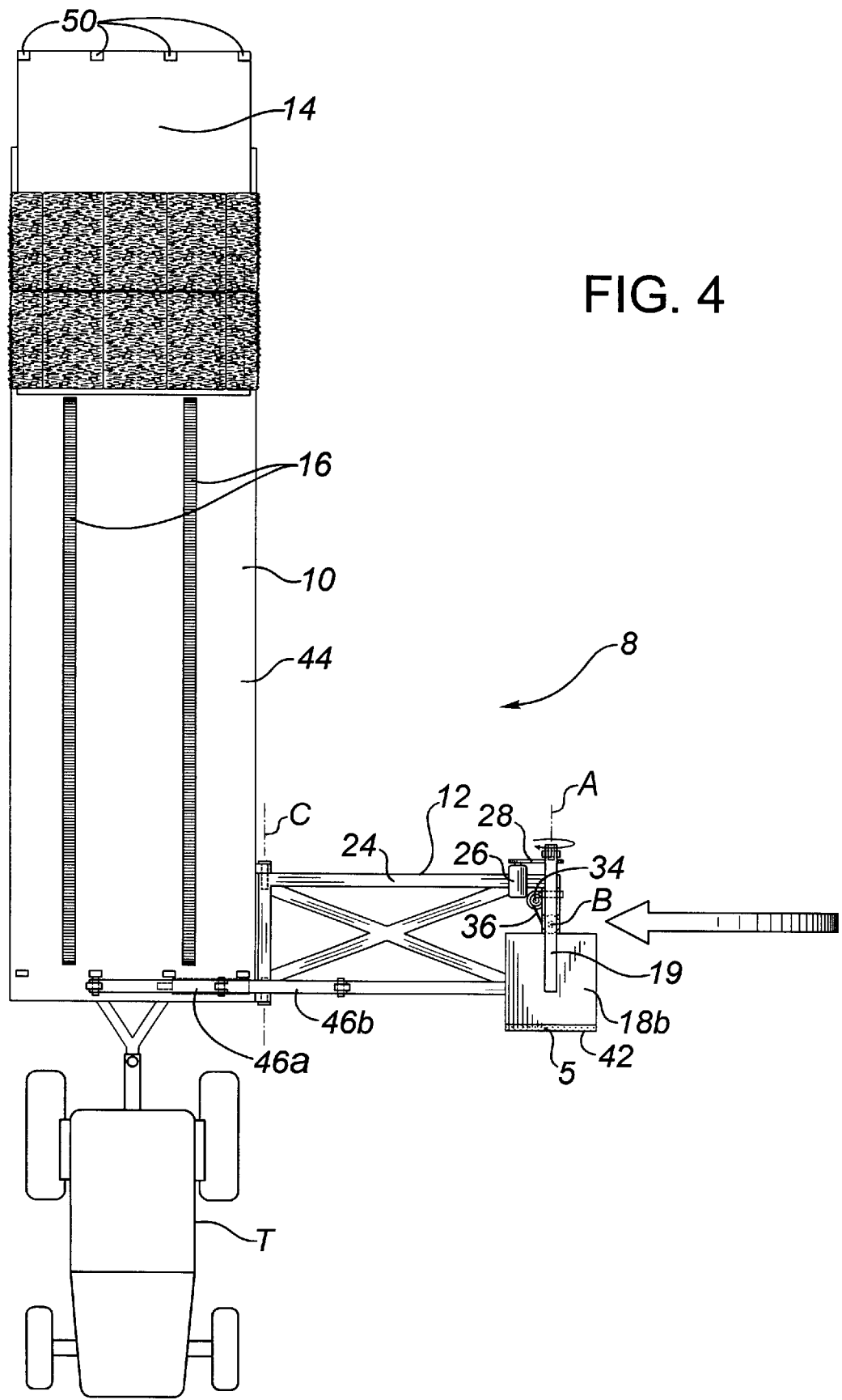
Figure 8:
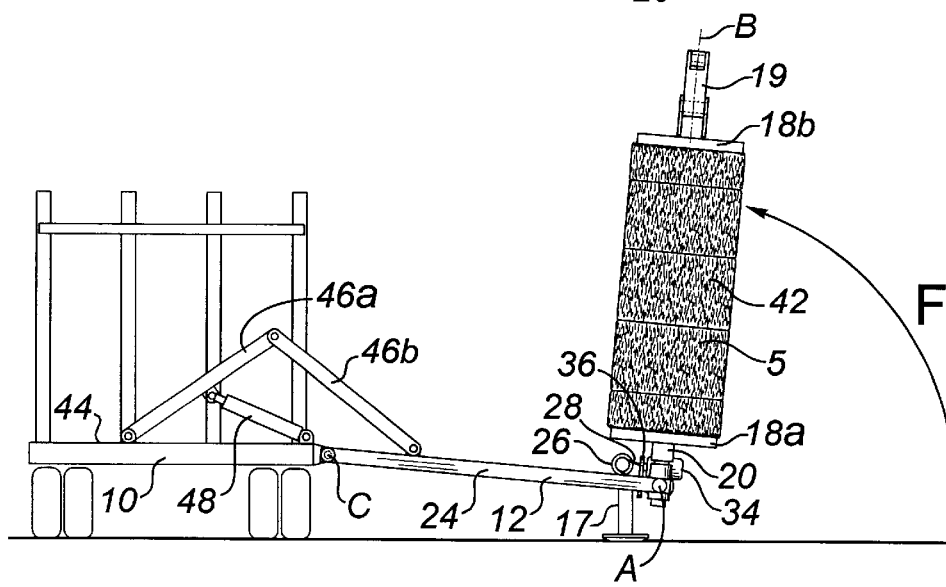

Once the bale (5) is firmly grasped, the grasper arm (20) is then swung upwards, pivoting about the axis (A) shown in the Figures. As a result, the grasper arm is oriented substantially vertically as is depicted in FIGS. 4 and 8. This movement of the grasper arm is accomplished by rotating a pivot member (23) which is part of the loading frame (24) and to which the grasper arm is affixed. The pivot member may be rotated by an orbit motor (26) and chain drive (28) as is shown in the Figures or by a hydraulic cylinder (30) and a lever arm (32).

Figure 5:
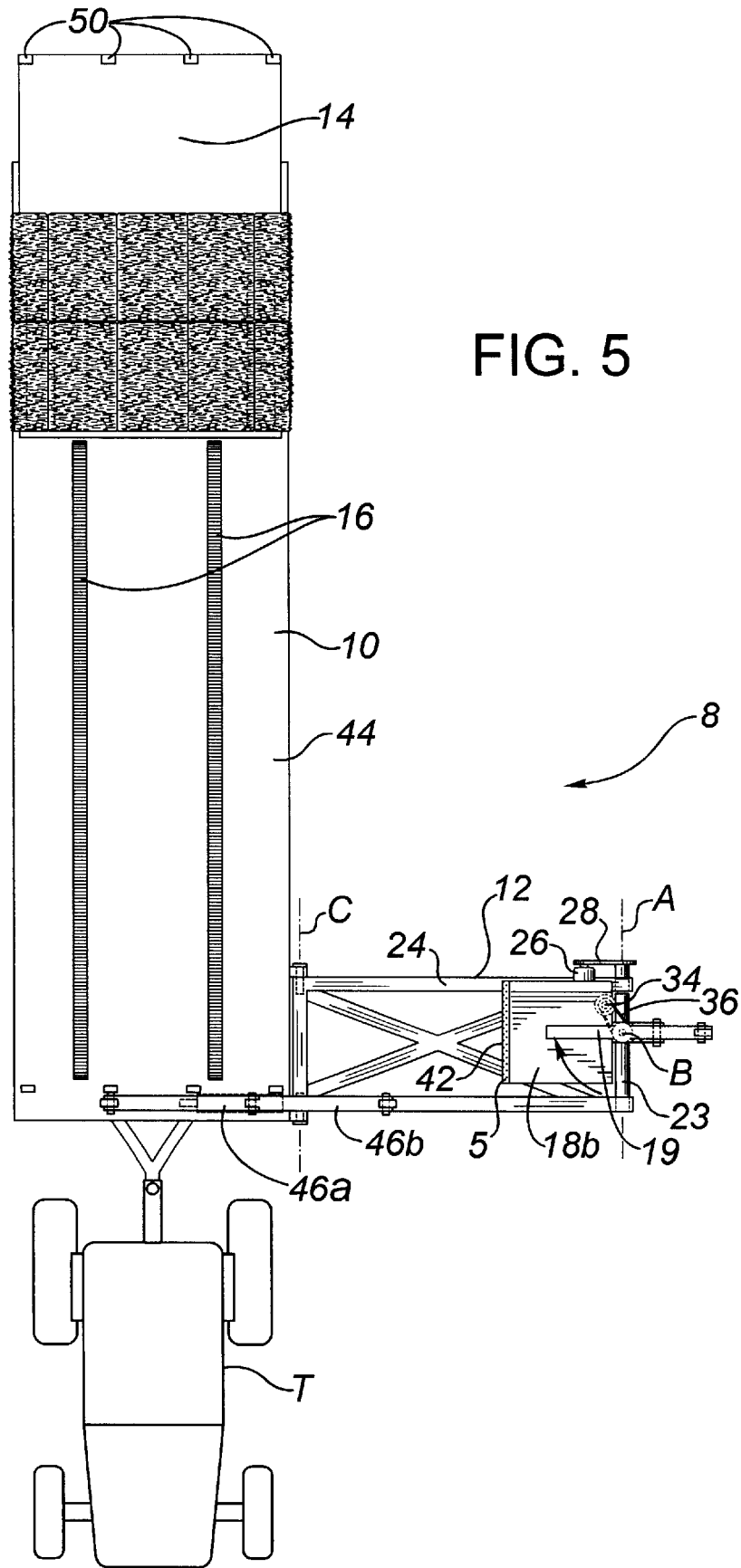
Figure 6:
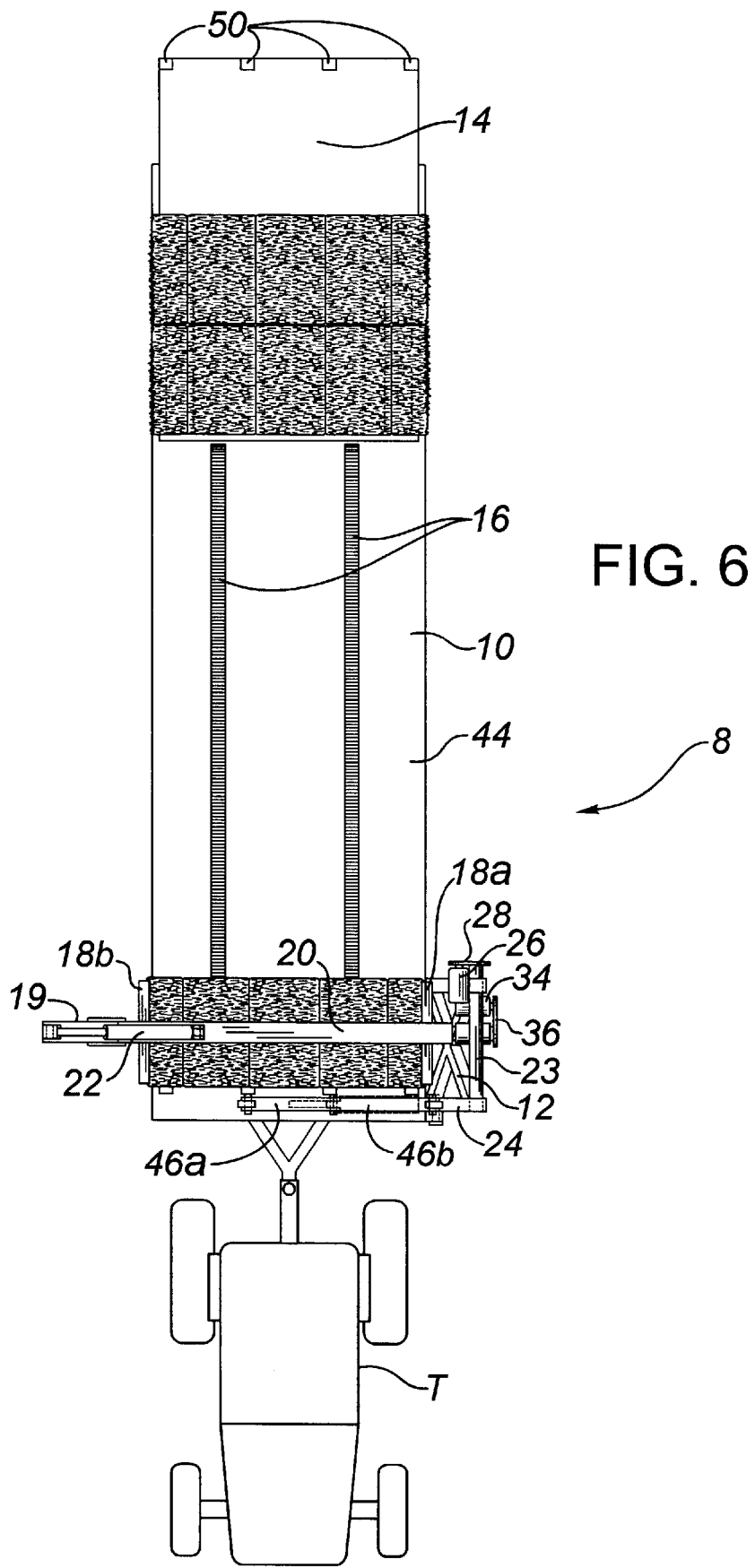
Figure 7:
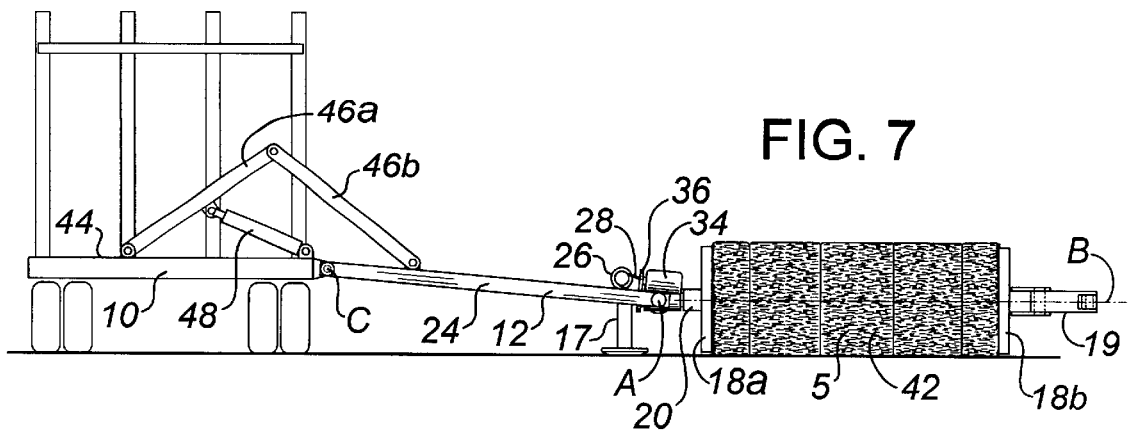
FIGS. 7, 8, 9, 10 and 11 are sequential views from the front of the loading positions of the bale loading arm, similar to FIGS. 2, 3, 4, 5 and 6 above.

From the position shown in FIG. 4, the grasper arm (20) is then rotated 90 degrees about its own longitudinal axis (B). Again, this rotational movement may be accomplished by an orbit motor (34) and chain drive (36) or by hydraulic cylinder (38) and a lever arm (40). As a result of this rotation, the original forward face (42) of the bale (5) is now facing the trailer (10), as is shown in FIG. 5. From this position, the loading frame is then pivoted upwards, about pivot axis (C), so that the bale is now positioned above the trailer deck (44), with the original forward face (42) of the bale (5) now facing downwards towards the trailer deck (44). The grasping paddles may then be opened and the bale drops to the trailer deck (44). The length of the loading frame permits enough clearance to stack the bales on the deck (44) as is shown in FIGS. 10 and 11.

Figure 9:
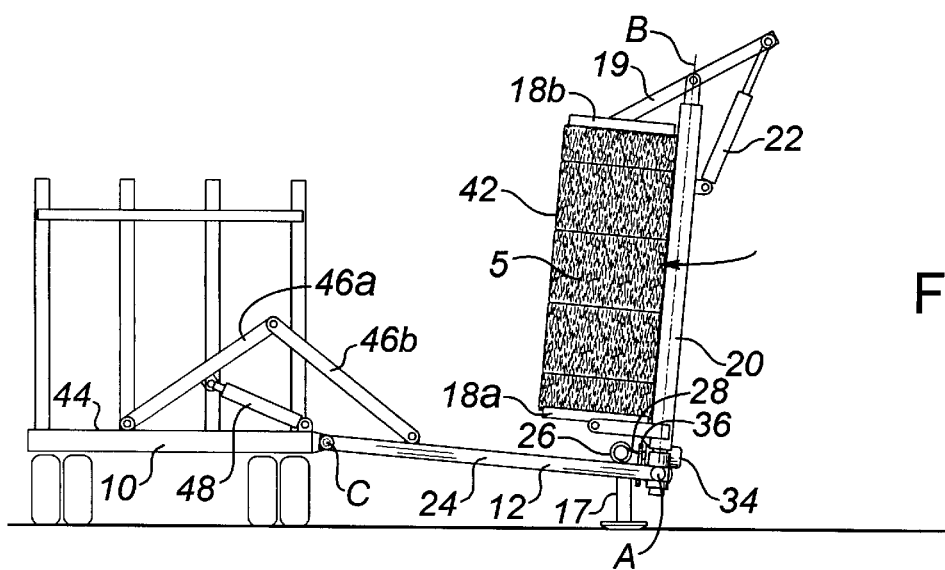
Figure 10:
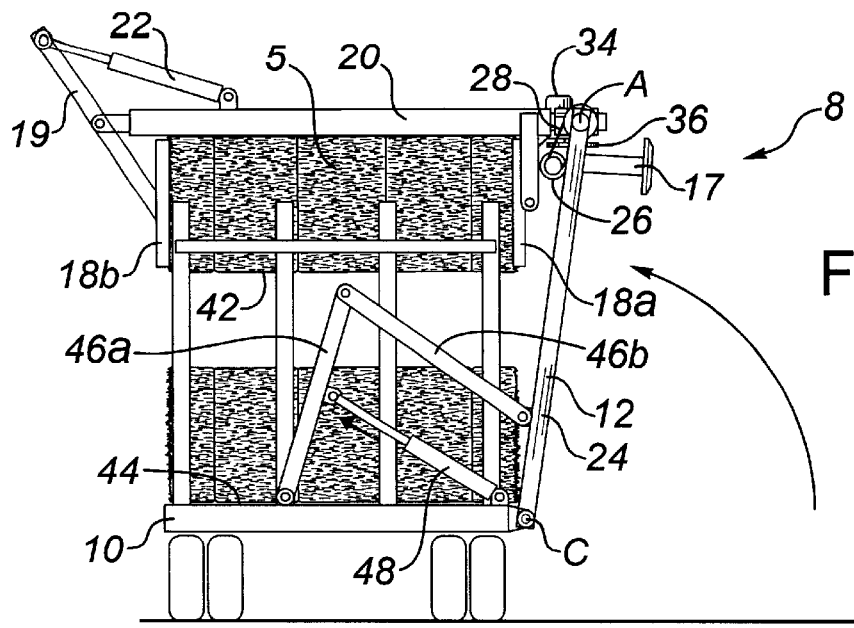
Figure 11:
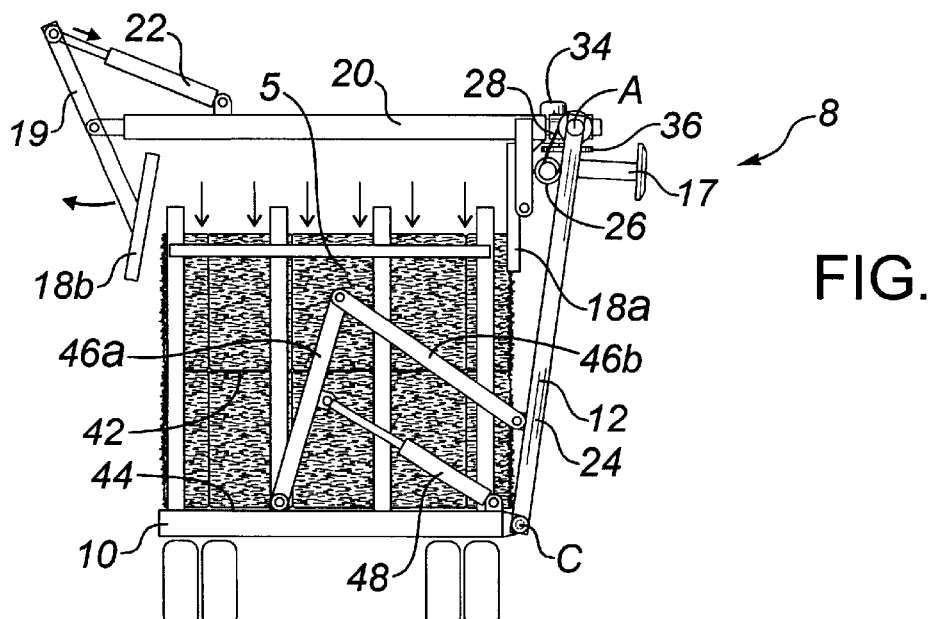

The loading frame (24) is preferably moved by an articulated lever arm (46) and a hydraulic cylinder (48) attached to the trailer (10) as is shown in FIGS. 9, 10 and 11. The articulated lever arm (46) includes a first arm (46a) and a second arm (46b). As is apparent, extension of the hydraulic cylinder (48) acts on the first arm (46a) to pull on the loading frame by means of the second arm (46b).

The movement of the elements of the loading arm (12) may then be reversed to position the loading arm (12) to grasp and load the next bale.

Figure 12A:
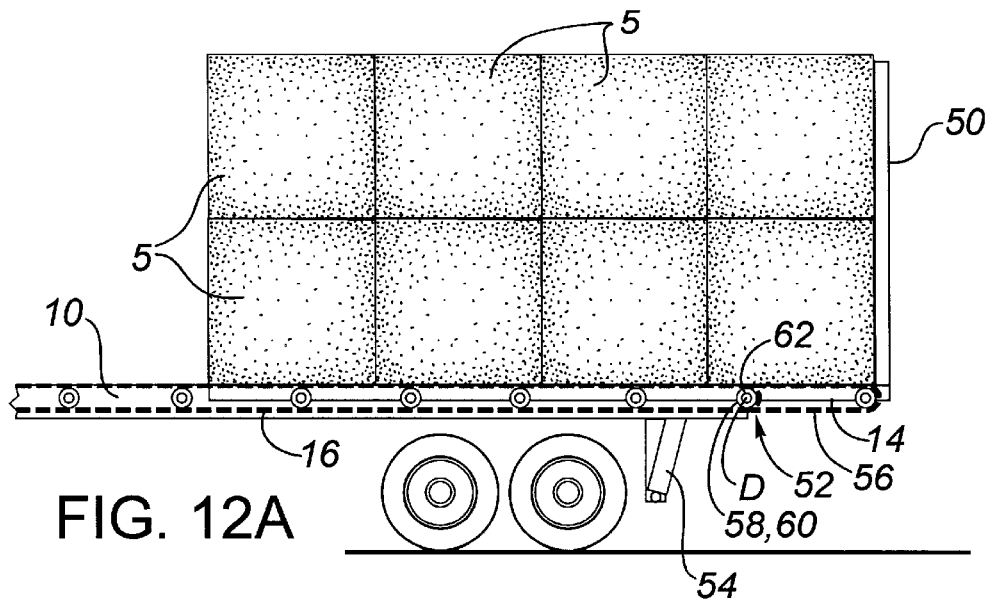
FIGS. 12a, 12b and 12c are side views of the pivot deck in its horizontal and vertical positions.
Figure 12B:
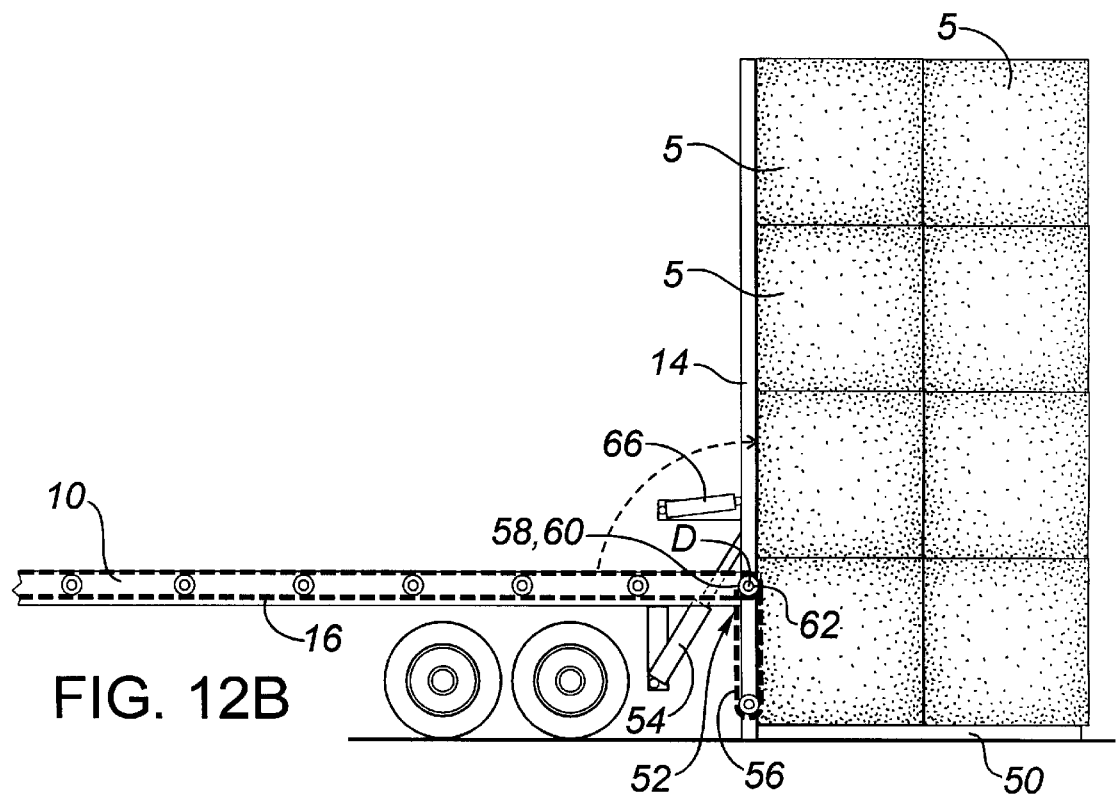

The operation of the pivot deck (14) at the rear end of the trailer (10) will now be described. The pivot deck (14) is pivotally mounted to the trailer (10) at the pivot deck pivot mounting (52). The pivot deck (14) can be pivoted at the pivot deck pivoting axis (D), such that when the pivot deck (14) is pivoted to a position substantially planar to the trailer deck (44), the chain conveyor (16), and pivot deck chain conveyor (56), can operate to slide bales along the pivot deck (14). When the pivot deck (14) is pivoted to a position substantially perpendicular to the trailer deck (44), as is shown in FIG. 12b, the bale retaining members (50) lay flat upon the ground.

Figure 12C:
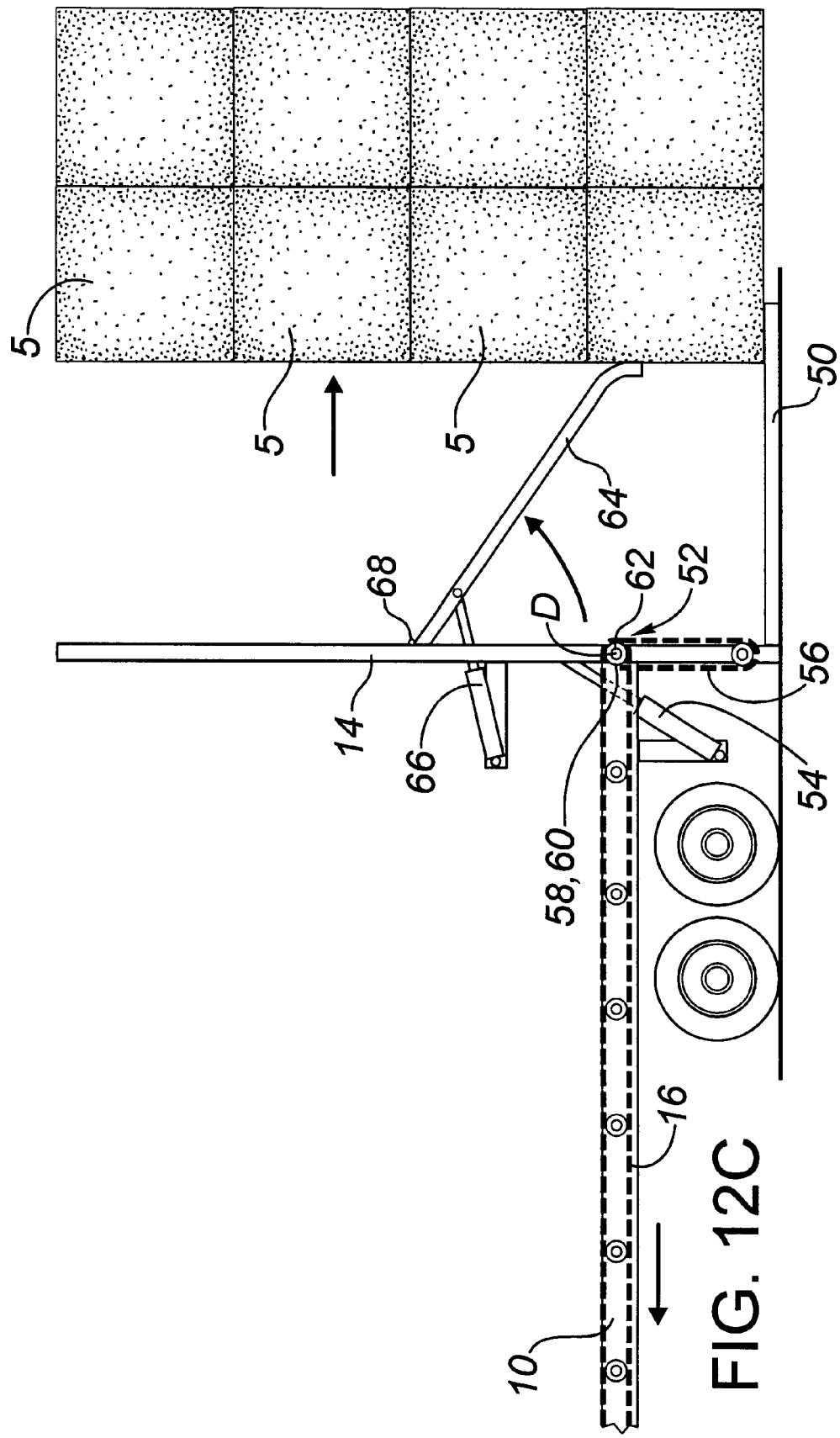
Figure 13:
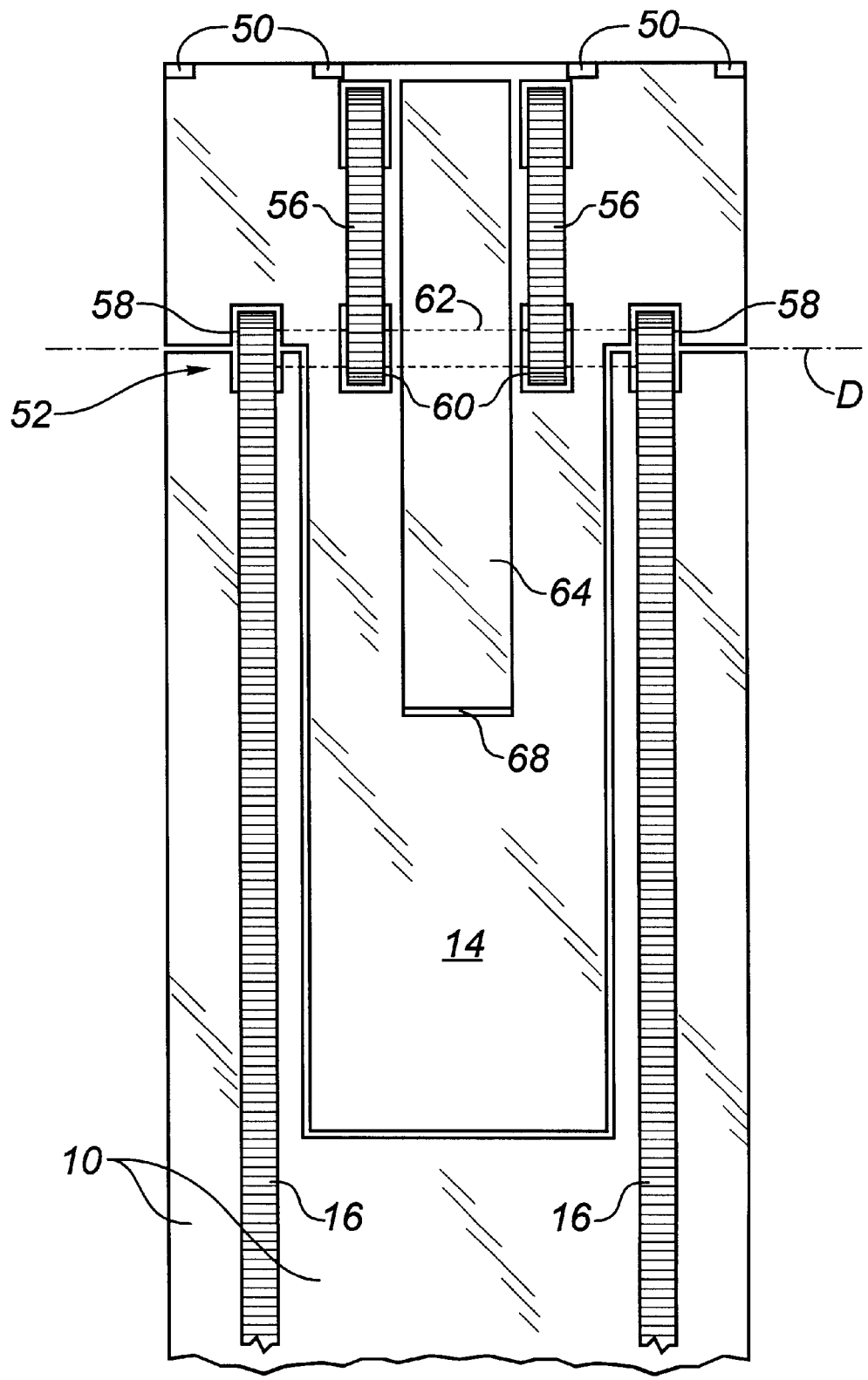
FIG. 13 is a top plan view showing the pivot deck and the conveyor means.

The bale pusher (64) is pivotally mounted to the pivot deck (14) at the bale pusher pivot mounting (68), as is shown in FIG. 12c. The bale pusher (64) can be pivoted at the bale pusher pivot mounting (68), by means of the bale pusher hydraulic ram (66), a scissor hoist, or some other suitable means, such that when the pivot deck (14) is pivoted to a position substantially perpendicular to the trailer deck (44), the bale pusher (64) can be used to push bales along the bale retaining members (50), as is shown in FIG. 12c.

Bales positioned on the pivot deck (14) may be unloaded by pivoting the pivot deck (14) so that the sides of the bales in contact with the bale retaining members (50) come into contact with the ground. If the bale pusher (64) is then pivoted so as to swing away from the pivot deck (14) and the trailer (10) is moved forward, the bale retaining members (50) slide out from under the bales. The bale pusher (64) may then be pivoted to a position substantially planar with the pivot deck (14) and the pivot deck (14) may be pivoted to the position substantially planar to the trailer deck (44), so as to receive the next bales to be unloaded. In this fashion, a neat row of stacked bales may be conveniently created in the storage area.

Stacked or individual bales on the ground may be loaded with the pivot deck (14) by pivoting the pivot deck (14) so that the pivot deck (14) is substantially perpendicular to the trailer deck (44). If the trailer (10) is then moved backward so as to slide the bale retaining members (50) under the bale or bales to be loaded, the pivot deck (14) may then be pivoted to the position substantially planar to the trailer deck (44). The bale or bales thus loaded may be moved forward on the trailer deck by means of the chain conveyor (16) and the pivot deck chain conveyor (56).

The pivotal movement of the pivot deck (14) may be accomplished by any convenient mechanical means. In a preferred embodiment shown in FIGS. 12a and 12b, a hydraulic cylinder (54) is used to pivot the pivot deck (14).

The chain conveyor (16) and pivot deck chain conveyor (56) operate together to move bales forward or backward along the flat bed trailer (10). In a preferred embodiment the chain conveyor end cogs (58) and the pivot deck chain conveyor end cogs (62) are concentrically fixed to the end cogs shaft (62) such that if the chain conveyor (16) is moving, the pivot deck chain conveyor (56) will also be moving in the same direction. Axis (D), the pivot axis of the pivot deck pivot mounting (52) is also the axis of rotation of the end cogs shaft (62), FIGS. (12b) and (13).

As will be apparent to those skilled in the art, various modifications, adaptations and variations of the foregoing specific disclosure can be made without departing from the scope of the present invention. Of course, alternative configurations of the lever arms and hydraulic cylinders used in the preferred embodiment to actuate the various moving components are easily conceivable by those skilled in the art and it is intended that such alternatives are encompassed by the scope of the claims appended hereto. In other words, the specific means shown in the Figures and described above to move or actuate the various moving components are not considered essential to the invention.

What is claimed is:

1. A bale loading arm for use with a bale carrier having a longitudinal axis said loading arm comprising:
    (a) a loading frame having a proximal end and a distal end, wherein said loading frame engages the bale carrier at its proximal end and said loading frame pivots about a substantially horizontal axis which is substantially parallel to the longitudinal axis of the carrier;
    (b) means for pivoting the loading frame;
    (c) a pivot member rotatably engaging the distal end of the loading frame, wherein said pivot member is substantially parallel to the pivot axis of the loading frame and is rotatable along a pivot member longitudinal axis;
    (d) means for rotating the pivot member; and
    (e) a bale grasper opening in a direction parallel to the longitudinal axis of the bale carrier having a grasper arm and grasping means affixxed to the grasper arm; wherein the grasper arm is rotatably mounted to the pivot member about a grasper arm axis extending perpendicular to said pivot member axis, extending outward from the loading frame and includes means for rotating the grasper arm.

2. The bale loading arm of claim 1 wherein the grasping means comprises a pair of opposed paddles, one of which is moveable between an open bale receiving position and a closed bale grasping position, and means for moving the moveable paddle.

3. The bale loading arm of claim 2 wherein the pair of opposed paddles extends from the grasping arm in the forward direction such that the bale carrier may be moved forward to position a bale within the bale grasping means.

4. The bale loading arm of claim 2 wherein the paddle moving means comprises a hydraulic cylinder disposed between the grasper arm and the paddle.

5. The bale loading arm of claim 1 wherein the loading frame is moved by a hydraulic cylinder and ram attached between the bale carrier and an articulating lever arm wherein said lever arm is attached to the bale carrier and the loading frame.

6. The bale loading arm of claim 1 wherein the pivot member rotation means comprises an orbit motor and chain drive.

7. The bale loading arm of claim 1 wherein the pivot member rotation means comprises a hydraulic cylinder and lever arm.

8. The bale loading arm of claim 1 wherein the grasping arm rotation means comprises an orbit motor and chain drive configuration.

9. The bale loading arm of claim 1 wherein the grasping arm rotation means comprises a hydraulic cylinder and lever arm.

10. A bale loading arm for use with a bale carrier having a longitudinal axis, said loading arm comprising:
    (a) a first member having a proximal end and a distal end which extends laterally outward from the bale carrier and which pivots about a substantially horizontal axis substantially parallel to the longitudinal axis of the bale carrier;
    (b) means for pivoting the first member;
    (c) a second member having a longitudinal axis which rotatably and pivotally engages the distal end of the first member such that the second member rotates and pivot about a second axis orthoganol to said second member longitudinal axis and parallel to the pivot axis of the first member said second member also being rotatably mounted to said distal end of the first member for rotation about said second member longitudinal axis;
    (d) means for rotating the second member about the second member longitudinal axis;
    (e) means for pivoting the second member about the second axis; and
    (f) bale grasping means affixed to the second member for grasping the bale and opening in a direction parallel to said bale carrier longitudinal axis.

11. The bale loading arm of claim 10 wherein the grasping means comprises a pair of opposed paddles, one of which is moveable between an open bale receiving position and a closed bale grasping position and means for moving one paddle.

12. The bale loading arm of claim 11 wherein the pair of opposed paddles extends from the second member in the forward direction such that the bale carrier may be moved forward to position a bale within the bale grasping means.

13. The bale loading arm of claim 11 wherein the paddle moving means comprises a hydraulic cylinder disposed between the second member and the paddle.

14. The bale loading arm of claim 10 wherein the first member pivot means comprises a hydraulic cylinder and ram attached between the bale carrier and an articulating lever arm wherein said lever arm is attached to the bale carrier and the first member.

15. The bale loading arm of claim 10 wherein the second member rotation means comprises an orbit motor and chain drive.

16. The bale loading arm of claim 10 wherein the second member rotation means comprises a hydraulic cylinder and lever arm.

17. The bale loading arm of claim 10 wherein the second member pivot means comprises an orbit motor and chain drive configuration.

18. The bale loading arm of claim 10 wherein the second member pivot means comprises a hydraulic cylinder lever arm.

* * * * *